United States Patent
Gingrich, III et al.

(10) Patent No.: US 10,256,769 B2
(45) Date of Patent: Apr. 9, 2019

(54) TERMINAL FOR SOLAR JUNCTION BOX

(71) Applicant: Tyco Electronics Corporation, Berwyn, PA (US)

(72) Inventors: Charles Raymond Gingrich, III, Mechanicsburg, PA (US); Matthew Edward Mostoller, Hummelstown, PA (US); Christopher George Daily, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 36 days.

(21) Appl. No.: 14/753,599

(22) Filed: Jun. 29, 2015

(65) Prior Publication Data

US 2016/0380585 A1    Dec. 29, 2016

(51) Int. Cl.
    *H02S 40/34*    (2014.01)
(52) U.S. Cl.
    CPC .................................. *H02S 40/34* (2014.12)
(58) Field of Classification Search
    CPC ....................................................... H02S 40/34
    See application file for complete search history.

(56) References Cited

U.S. PATENT DOCUMENTS

| | | | | |
|---|---|---|---|---|
| 7,444,743 B2* | 11/2008 | Feldmeier | ......... | B32B 17/10036 29/748 |
| 2006/0283628 A1* | 12/2006 | Feldmeier | ......... | B32B 17/10036 174/260 |
| 2010/0263714 A1* | 10/2010 | Lauermann | ............. | H02S 40/34 136/251 |
| 2014/0127951 A1* | 5/2014 | Watrinet | ................. | H02S 40/34 439/709 |

FOREIGN PATENT DOCUMENTS

| DE | 10 2008 039933 A1 | 3/2010 |
|---|---|---|
| EP | 1 729 369 A2 | 12/2006 |
| EP | 2 827 494 A1 | 1/2015 |

OTHER PUBLICATIONS

International Search Report, International Application No. PCT/US2016/038463, International Filing Date, Jun. 21, 2016.

* cited by examiner

*Primary Examiner* — Hung V Ngo

(57) ABSTRACT

A solar junction box for a solar panel includes a housing having a base and walls defining a cavity. The cavity extends along a primary axis and a secondary axis generally perpendicular to the primary axis. The base has a foil opening receiving a foil of the solar panel. A terminal is received in the cavity. The terminal has a protection device contact terminated to a protection device and a foil contact configured to be terminated to the foil. The foil contact is oriented within the cavity such that the foil contact is configured to be terminated to the foil when the foil extends into the foil opening along the primary axis and such that the foil contact is configured to be terminated to the foil when the foil extends into the foil opening along the secondary axis.

9 Claims, 3 Drawing Sheets

TERMINAL FOR SOLAR JUNCTION BOX

BACKGROUND OF THE INVENTION

The subject matter herein relates generally to solar junction boxes for solar panels.

Photovoltaic (PV) modules or arrays, such as solar panels, produce electricity from solar energy. Electrical power produced by PV modules reduces the amount of energy required from non-renewable resources such as fossil fuels and nuclear energy. Significant environmental benefits are also realized from solar energy production, for example, reduction in air pollution from burning fossil fuels, reduction in water and land use from power generation plants, and reduction in the storage of waste byproducts. Solar energy produces no noise, and has few moving components. Because of their reliability, PV modules also reduce the cost of residential and commercial power to consumers.

PV cells are essentially large-area semiconductor diodes. Due to the photovoltaic effect, the energy of photons is converted into electrical power within a PV cell when the PV cell is irradiated by a light source such as sunlight. PV cells are typically interconnected into solar modules that have power ranges of up to 100 watts or greater. For large PV systems, special PV modules are produced with typical power range of up to several 100 W. A photovoltaic module is the basic element of a photovoltaic power generation system. A PV module has many solar cells interconnected in series or parallel, according to the desired voltage and current parameters. PV cells are connected in series with thin contacts, such as a foil. The foil is terminated to a junction box, which may electrically connect groups of the PV cells and/or solar panels.

The junction box is typically connected to the back side of the solar panel, such as to a substrate layer. The foil is terminated to a corresponding terminal in the junction box. However, the foils may be routed in various different directions relative to the solar panel, such as side-to-side, top-to-bottom, bottom-to-top, and the like. The junction box must be oriented in a direction that corresponds to the foil axis direction of the foil for proper termination to the terminal because the terminal is limited to receiving the foil in a single direction. Conventional solar junction boxes only accept the foil from one direction. A need remains for a universal solar junction box capable of accepting foils from different directions.

BRIEF DESCRIPTION OF THE INVENTION

In one embodiment, a solar junction box is provided for a solar panel having at least one photovoltaic cell and a foil electrically connected to the at least one cell. The solar junction box includes a housing having a base and walls defining a cavity. The cavity extends along a primary axis and a secondary axis generally perpendicular to the primary axis. The base has at least one foil opening configured to receive the foil. A protection device is received in the cavity. A terminal is received in the cavity. The terminal has a protection device contact terminated to the protection device and a foil contact configured to be terminated to the foil. The foil contact is oriented within the cavity such that the foil contact is configured to be terminated to the foil when the foil extends into the foil opening along the primary axis and such that the foil contact is configured to be terminated to the foil when the foil extends into the foil opening along the secondary axis.

In another embodiment, a solar junction box is provided for a solar panel having at least one photovoltaic cell and a foil electrically connected to the at least one cell. The solar junction box includes a housing having a base and walls defining a cavity. The cavity extends along a primary axis and a secondary axis generally perpendicular to the primary axis. The base has at least one foil opening. A protection device is received in the cavity. A terminal is received in the cavity. The terminal has a protection device contact terminated to the protection device and a foil contact configured to be terminated to the foil. The foil contact has a first leg oriented along the opening to be terminated to the foil when the foil extends into the foil opening along the primary axis and the foil contact has a second leg oriented along the opening to be terminated to the foil when the foil extends into the foil opening along the secondary axis.

In a further embodiment, a solar junction box is provided for a solar panel having at least one photovoltaic cell and a foil electrically connected to the at least one cell. The solar junction box includes a housing having a base and walls defining a cavity. The cavity extends along a primary axis and a secondary axis generally perpendicular to the primary axis. The base has at least one foil opening. A protection device is received in the cavity. A terminal is received in the cavity. The terminal has a protection device contact terminated to the protection device and a foil contact configured to be terminated to the foil. The foil contact is oriented within the cavity along a contact axis oriented approximately 45° to the primary axis and approximately 45° to the secondary axis such that the foil contact is configured to be terminated to the foil when the foil extends into the foil opening along the primary axis and such that the foil contact is configured to be terminated to the foil when the foil extends into the foil opening along the secondary axis.

DETAILED DESCRIPTION OF THE INVENTION

Figure 1:
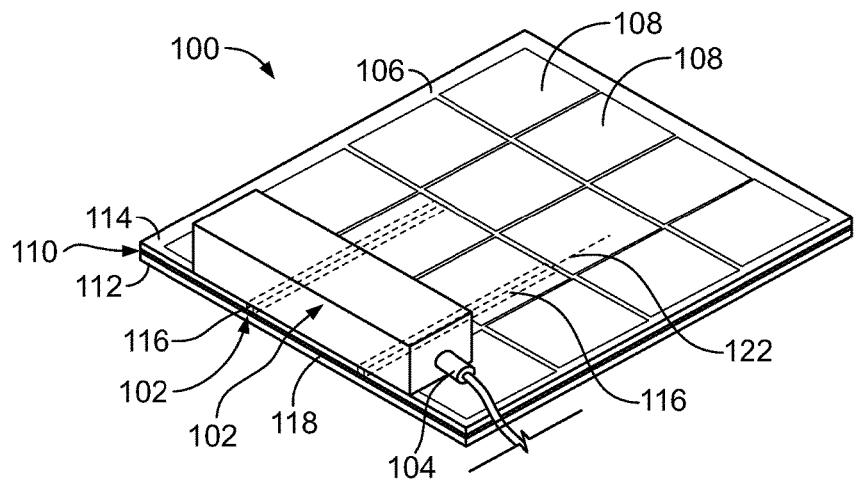
FIG. 1 illustrates a photovoltaic (PV) system formed in accordance with an exemplary embodiment.

FIG. 1 illustrates a photovoltaic (PV) system 100 formed in accordance with an exemplary embodiment. The PV system 100 includes one or more solar junction boxes 102 (one shown in FIG. 1), which may be electrically connected by connector assemblies 104 (e.g., cable connector assemblies). The PV system 100 includes a plurality of PV components 106. In an exemplary embodiment, the PV components 106 may be any type of PV components, such as PV modules or arrays that are used to generate electricity, such as solar panels, or other PV components used within the PV system 100 such as power storage devices, sensors, controllers, and the like. In the illustrated embodiment, the PV components 106 are solar panels and may be referred to hereinafter as solar panels 106. The solar panels 106 have a plurality of PV cells 108 configured to generate electricity.

The connector assemblies 104 may be coupled solar junction boxes 102 of the same solar panel 106 or solar junction boxes 102 of different solar panels 106. The connector assemblies 104 transmit power and/or data along the transmission path between the PV components 106.

In an exemplary embodiment, the solar panel 106 includes a semiconductor layer 110 sandwiched between a glass layer 112 and a substrate layer 114. The semiconductor layer 110 includes the cells 108 and conductors, such as conductive foils 116, connecting the cells 108 in series. Groups of the cells 108 may be electrically connected to the corresponding solar junction box 102. For example, the foil 116 may be terminated to a corresponding terminal in the solar junction box 102. In an exemplary embodiment, the solar junction box 102 is mounted to the solar panel 106 at an edge 118 of the solar panel 106. The foils 116 may extend from the edge to the solar junction box 102.

The glass layer 112 is positioned above the semiconductor layer 110 and allows sunlight to pass therethrough to the cells 108. The substrate layer 114 is positioned below the semiconductor layer 110. The substrate layer 114 may be a plastic layer. Alternatively, the substrate layer 114 may be manufactured from another material. For example, the substrate layer 114 may be another glass layer. For example, in some various embodiments, the solar panel 106 may be a bifacial solar panel configured to receive sunlight from both sides of the solar panel 106. For example, the backside (substrate layer 114) may receive reflective sunlight. The foils 116 from the semiconductor layer 110 exit the solar panel 106 at foil exits 120 at the edge 118. The foil exits 120 are between the glass layer 112 and the substrate layer 114. The foils 116 are routed to the solar junction box 102, which, in the illustrated embodiment, is mounted to the backside of the solar panel 106, such as to the substrate layer 114. Each foil 116 extends along a foil axis 122, which is generally the longitudinal axis of the foil 116. The foil 116 may be routed in any direction along the solar panel 106, such as up the panel, down the panel, side-to-side across the panel, transverse across the panel, longitudinally, laterally, or otherwise. The foil axis 122 may be parallel to one of the edges 118; however the foil axis 122 may be transverse to the edges 118 in alternative embodiments. Additionally, different foils 116 may be routed in different directions.

While FIG. 1 is a bottom perspective view showing the solar junction box 102 mounted to the substrate layer 114, in use, the glass layer 112 would be on top or upward facing to face the sun and the solar junction box 102 would be mounted to the backside of the solar panel 106. Other orientations are possible and terms denoting orientation (e.g., top, bottom, up, down, etc.) may be relative to the orientation shown in the particular Figure as opposed to an orientation in use.

Figure 2:
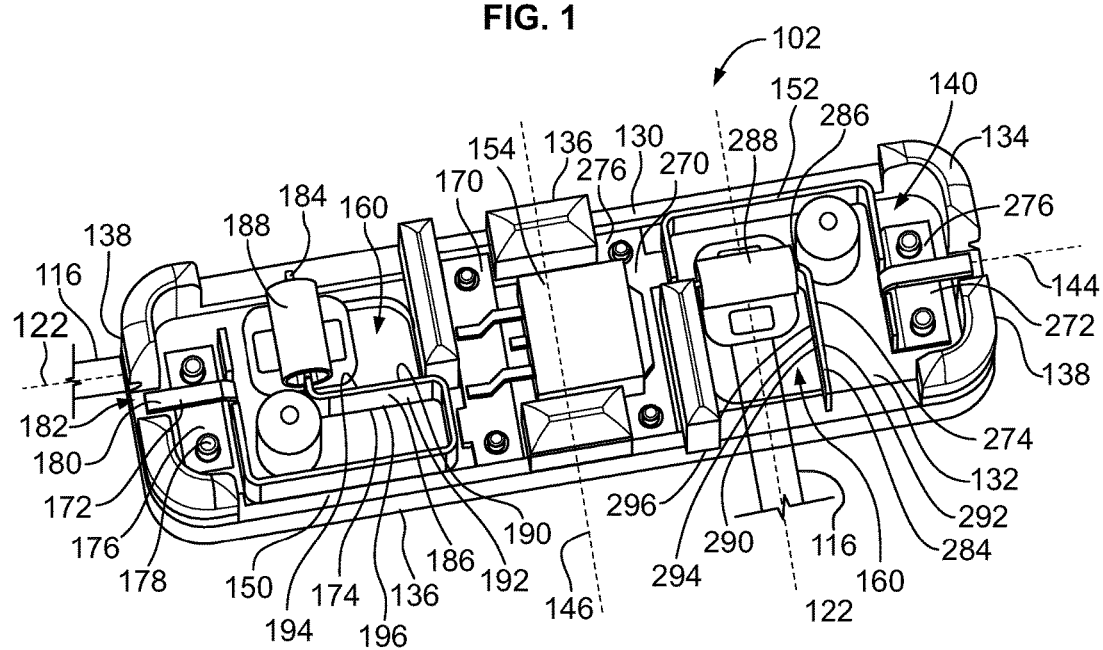
FIG. 2 is a partially exploded view of a solar junction box of the PV system formed in accordance with an exemplary embodiment.

FIG. 2 is a partially exploded view of the solar junction box 102 formed in accordance with an exemplary embodiment. The solar junction box 102 includes a housing 130 configured to be mounted to the solar panel 106. The housing 130 includes a base 132 and a plurality of walls 134 extending from the base 132. Any number of walls 134 may be provided to provide an appropriate shaped housing for the particular application. In the illustrated embodiment, the walls 134 include side walls 136 and end walls 138 extending between the side walls 136. Optionally, the housing 130 may have a rectangular cross section, being long and narrow, with the side walls 136 longer than the end walls 138. Other shapes are possible in alternative embodiments.

The side walls 136 and end walls 138 define a cavity 140 of the housing 130. The solar junction box 102 also includes a lid or cover 142 (shown in FIG. 3). The solar junction box 102 holds electrical components configured to be electrically connected to one or more of the foils 116 in the cavity 140. The cover 142 covers the cavity 140 and electrical components.

The housing 130 is long and narrow and generally extends along a mutually perpendicular primary axis 144 and secondary axis 146. The primary axis 144 may extend in a longitudinal direction and may define a longitudinal axis 144. The secondary axis 146 may extend in a lateral direction and may define a lateral axis 146. In an exemplary embodiment, the side walls 136 are generally parallel to the primary axis 144 and the end walls 138 are generally parallel to the secondary axis 146.

In an exemplary embodiment, the solar junction box 102 includes a positive terminal 150 and a negative terminal 152 in the cavity 140. In an exemplary embodiment, the solar junction box 102 includes a protection device 154 electrically connected to the terminals 150, 152. The protection device 154 may be used to bypass or isolate the solar circuit. For example, the protection device 154 may allow power flow in one direction and restrict power flow in an opposite direction. Optionally, the protection device 154 may limit power flow in a direction from the solar cell 106 and restrict power flow back into the solar cell 106 in certain circumstances. For example, when the solar cell 106 is shaded or damaged and not producing electricity, the protection device 154 may block reverse flow of electricity through the system back to the cells 108, which may cause damage to the cells 108. The protection device 154, as in the illustrated embodiment, may be a bypass diode and may referred to hereinafter as bypass diode 154; however the protection device 154 is not limited to a bypass diode. Other types of protection devices 154 may be used in alternative embodiments. For example, the protection device 154 may be a circuit assembly including a circuit board and other components that protect the system. The protection device 154 may be an isolator to isolate the terminals 150, 152. The protection device may be a MOSFET. The protection device 154 may include a microprocessor or other component to control and/or monitor the system. Optionally, the bypass diode 154 may be positioned between the positive and negative terminals 150, 152. The bypass diode 154 may be electrically connected to each of the terminals 150, 152. Optionally, the bypass diode 154 may be approximately centered between the end walls 138. The solar junction box 102 may include other electrical components in alternative embodiments.

The positive terminal 150 is terminated to a corresponding foil 116 and the negative terminal 152 is terminated to a corresponding foil 116. In an exemplary embodiment, the terminals 150, 152 are configured to receive the foils 116 from different directions (e.g., when the foils 116 run up and down the panel 106 or when the foils 116 run side-to-side across the panel 106). The terminals 150 and/or 152 may be terminated to other components, such as electrical connectors or cables.

The terminals 150, 152 are positioned near corresponding foil openings 160 in the base 132. The foil openings 160 receive corresponding foils 116 and allow the foils 116 to pass into the cavity 140. The foil openings 160 are configured to receive the corresponding foils 116, which may enter the housing 130 from different various directions (e.g., longitudinally or laterally). For example, the foil opening 160 is sized and shaped to receive the foil 116 when (if) the foil is extending along the primary axis 144 and when (if) the foil 116 extends along the secondary axis 146. The foil opening 160 is able to accept the foil 116 from either direction. In the illustrated embodiment, the foil opening 160 is square shaped and has a width/length wide enough to accept the foil 116 from either direction. The foil openings 160 may be ramped and/or curved along the base to allow the foil 116 to transition into the foil opening 160 without damaging the foil 116.

The positive terminal 150 is mounted within the cavity 140 and is configured to be electrically connected to the positive foil 116, the bypass diode 154 and may be electrically connected to another component, such as one of the connector assemblies 104 (shown in FIG. 1). In an exemplary embodiment, the positive terminal 150 includes a protection device contact 170 configured to be terminated to the bypass diode 154. The positive terminal 150 includes a plug contact 172 configured to be terminated to the connector assembly 104 or other components. The positive terminal 150 includes a foil contact 174 configured to be terminated to the foil 116. The terminal 150 may include intermediate segments extending between the protection device contact 170, plug contact 172 and/or foil contact 174. Optionally, the protection device contact 170 may be oriented generally horizontally. The foil contact 174 may be oriented generally vertically. The plug contact 172 may have a portion oriented generally vertically and another portion oriented generally horizontally.

Optionally, the terminal 150 may include one or more mounting pads 176 for mounting the terminal 150 to the housing 130. Optionally, the mounting pads 176 may be integral with, or defined by, one of the other contacts, such as the protection device contact 170, the plug contact 172 and/or the foil contact 174. The mounting pads 176 have openings that receive posts 178 extending from the base 132. The posts 178 may be held in the openings of the mounting pads 176 by an interference fit. Optionally, at least some of the posts 178 may be heat staked to hold the mounting pads 176 onto the base 132 (e.g., to prevent lift off).

Optionally, some of the mounting pads 176 may be able to float on the corresponding posts 178. For example, the mounting pads 176 associated with the plug contact 172 are fixed relative to the housing 130 while the mounting pads 176 associated with the protection device contact 170 are able to float in or more directions (e.g., longitudinally and/or laterally). As such, the protection device contact 170 is able to float with the housing 130 as the housing 130 expands and contracts due to thermal expansion and contraction and/or due to bending of the housing 130. Allowing the protection device contact 170 to float relative to the bypass diode 154 may reduce damage to the electrical interface (e.g., diode leads) between the bypass diode 154 and the terminal 150.

The plug contact 172 includes a plug interface 180 configured to be electrically connected to the connector assembly 104 or other component. The plug interface 180 may be accessible through an opening 182 in the end wall 138. A portion of the connector assembly 104 may extend though the opening 182. Alternatively, a portion of the plug interface 180 may extend through the opening 182 for electrical connection to the connector assembly 104.

The foil contact 174 is oriented within the cavity 140 such that the foil contact 174 is configured to be terminated to the foil 116 when the foil 116 extends into the foil opening 160 along the primary axis 144 and the foil contact 174 is oriented within the cavity 140 such that the foil contact 174 is configured to be terminated to the foil 116 when the foil 116 extends into the foil opening 160 along the secondary axis 146. As such, the foil contact 174 is oriented to accept the foil 116 from multiple directions. The foil contact 174 allows the foil 116 to come from either direction into the housing 130 to be terminated thereto.

In the illustrated embodiment, the foil contact 174 includes a first leg 184 and a second leg 186. Optionally, the first and second legs 184, 186 may be oriented perpendicular to the base 132. For example, the first and second legs 184, 186 may be oriented vertically while the base 132 is oriented horizontally. The first leg 184 is orientated along the foil opening 160 to be terminated to the foil 116 when the foil 116 extends into the foil opening 160 along the primary axis 144. The second leg 186 is oriented along the foil opening 160 to be terminated to the foil 116 when the foil 116 extends into the foil opening 160 along the secondary axis 146 (the foil 116 is illustrated as being terminated to the first leg 184 in FIG. 2).

In an exemplary embodiment, the first leg 184 is oriented perpendicular to the second leg 186. In the illustrated embodiment, the first leg 184 extends laterally, such as parallel to the end walls 138 while the second leg 186 extends longitudinally, such as parallel to the side walls 136. The second leg 186 extends from the protection device contact 170 (or an intermediate segment associated with the protection device contact 170) and the first leg 184 extends from the second leg 186 to a distal end of the terminal 150 such that the legs 184, 186 meet at a corner. Optionally, another segment of the terminal 150 may be provided between the first and second legs 184, 186 such that the first leg 184 does not extend directly from the second leg 186. Alternatively, the second leg 186 may extend from the first leg 184 with the first leg 184 extending from the protection device contact 170. In other alternative embodiments, the foil contact 174 may extend from another portion of the terminal 150, such as from the plug contact 172 or elsewhere. Other configurations are possible in alternative embodiments.

In an exemplary embodiment, a clip 188 is used to secure the foil 116 to the foil contact 174. For example, the clip 188 may be an omega clip (e.g., omega shaped) that pinches against both sides of the foil contact 174. In the illustrated embodiment, the clip 188 is coupled to the second leg 186 to terminate the foil 116 to the second leg 186; however, the clip 188 may be terminated to the first leg 184, such as when the foil 116 is configured to terminate to the first leg 184. The foil 116 may wrap around the foil contact 174, and the clip 188 may sandwich the foil 116 between the foil contact 174 and the clip 188 along both sides of the foil contact 174. Other types of clips may be provided in alternative embodiments. In other various embodiments the foil 116 may be terminated to the foil contact 174 by other processes other than using a clip. For example, the foil 116 may be pinched by a lance or other portion integral with the terminal 150 or the foil 116 may be welded or soldered to the foil contact 174.

The foil contact 174 has an interior 190 facing the foil opening 160 and an exterior 192 opposite the interior 190. The foil contact 174 includes an outer edge 194 opposite a base 196 of the foil contact 174. The base 196 may abut against or face the base 132 of the housing 130. When the foil 116 is terminated to the foil contact 174, the foil 116 extends into the foil opening 160 and is wrapped around the foil contact 174 along the interior 190 over the outer edge 194 and along the exterior 192. The clip 188 may press the foil 116 against the interior 190 and exterior 192 to create an electrical connection between the foil 116 and the terminal 150.

The negative terminal 152 is mounted within the cavity 140 and is configured to be electrically connected to the negative foil 116, the bypass diode 154 and may be electrically connected to another component, such as one of the connector assemblies 104 (shown in FIG. 1). Optionally, the negative terminal 152 may be identical to the positive terminal 150 and may be rotated 180° within the cavity 140.

In an exemplary embodiment, the negative terminal 152 includes a protection device contact 270 configured to be terminated to the bypass diode 154. The negative terminal 152 includes a plug contact 272 configured to be terminated to the connector assembly 104 or other components. The negative terminal 152 includes a foil contact 274 configured to be terminated to the foil 116. The terminal 152 may include intermediate segments extending between the protection device contact 270, plug contact 272 and/or foil contact 274. Optionally, the terminal 152 may include one or more mounting pads 276 for mounting the terminal 152 to the housing 130.

The foil contact 274 is oriented within the cavity 140 such that the foil contact 274 is configured to be terminated to the negative foil 116 when the foil 116 extends into the foil opening 160 along the primary axis 144 and the foil contact 274 is oriented within the cavity 140 such that the foil contact 274 is configured to be terminated to the foil 116 when the foil 116 extends into the foil opening 160 along the secondary axis 146. As such, the foil contact 274 is oriented to accept the negative foil 116 from multiple directions. The foil contact 274 allows the foil 116 to come from either direction into the housing 130 to be terminated thereto.

In the illustrated embodiment, the foil contact 274 includes a first leg 284 and a second leg 286. The first leg 284 is orientated along the foil opening 160 to be terminated to the foil 116 when the foil 116 extends into the foil opening 160 along the primary axis 144. The second leg 286 is oriented along the foil opening 160 to be terminated to the foil 116 when the foil 116 extends into the foil opening 160 along the secondary axis 146 (the foil 116 is illustrated as being terminated to the second leg 286 in FIG. 2).

In an exemplary embodiment, the first leg 284 is oriented perpendicular to the second leg 286. In the illustrated embodiment, the first leg 284 extends laterally, such as parallel to the end walls 138 while the second leg 286 extends longitudinally, such as parallel to the side walls 136. The second leg 286 extends from the protection device contact 270 (or an intermediate segment associated with the protection device contact 270) and the first leg 284 extends from the second leg 286 to a distal end of the terminal 152 such that the legs 284, 286 meet at a corner. Optionally, another segment of the terminal 152 may be provided between the first and second legs 284, 286 such that the first leg 284 does not extend directly from the second leg 286. Alternatively, the second leg 286 may extend from the first leg 284 with the first leg 284 extending from the protection device contact 270. In other alternative embodiments, the foil contact 274 may extend from another portion of the terminal 152, such as from the plug contact 272 or elsewhere. Other configurations are possible in alternative embodiments.

In an exemplary embodiment, a clip 288 is used to secure the foil 116 to the foil contact 274. For example, the clip 288 may be an omega clip (e.g., omega shaped) that pinches against both sides of the foil contact 274. In the illustrated embodiment, the clip 288 is coupled to the second leg 286 to terminate the foil 116 to the second leg 286; however, the clip 288 may be terminated to the first leg 284, such as when the foil 116 is configured to terminate to the first leg 284. The foil 116 may wrap around the foil contact 274, and the clip 288 may sandwich the foil 116 between the foil contact 274 and the clip 288 along both sides of the foil contact 274. Other types of clips may be provided in alternative embodiments. In other various embodiments the foil 116 may be terminated to the foil contact 274 by other processes other than using a clip. For example, the foil 116 may be pinched by a lance or other portion integral with the terminal 152 or the foil 116 may be welded or soldered to the foil contact 274.

The foil contact 274 has an interior 290 facing the foil opening 160 and an exterior 292 opposite the interior 290. The foil contact 274 includes an outer edge 294 opposite a base 296 of the foil contact 274. The base 296 may abut against or face the base 132 of the housing 130. When the foil 116 is terminated to the foil contact 274, the foil 116 extends into the foil opening 160 and is wrapped around the foil contact 274 along the interior 290 over the outer edge 294 and along the exterior 292. The clip 288 may press the foil 116 against the interior 290 and exterior 292 to create an electrical connection between the foil 116 and the terminal 152.

Figure 3:
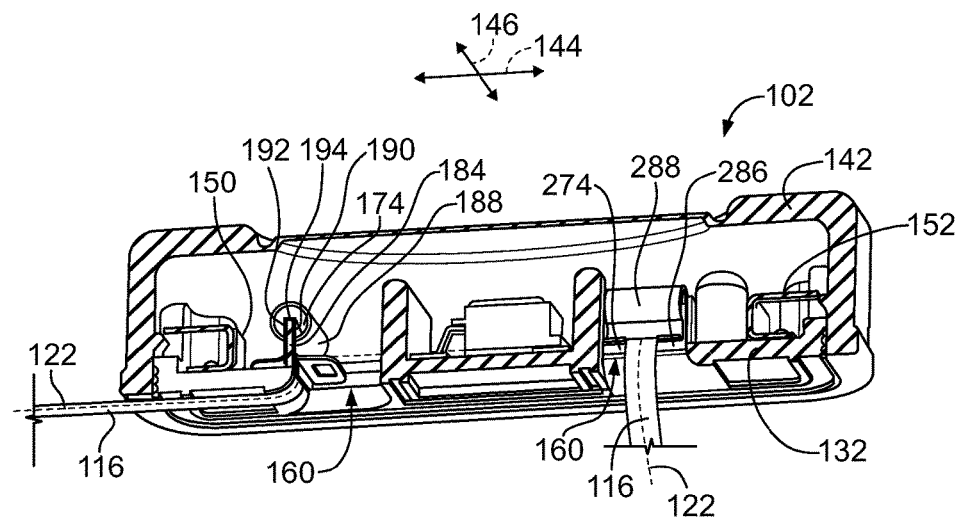
FIG. 3 is a perspective, partial cut-away view of the solar junction box and a foil terminated to terminals of the solar junction box.

FIG. 3 is a bottom perspective, partial cut-away view of the solar junction box 102 and the foil 116 terminated to the terminals 150, 152. The positive foil 116 is terminated to the first leg 184 of the positive terminal 150 and the negative foil 116 is terminated to the second leg 286 of the negative terminal 152 using the clips 188, 288, respectively. The positive foil 116 extends along the corresponding foil axis 122 parallel to the primary axis 144. The secondary foil 116 extends along the corresponding foil axis 122 parallel to the secondary axis 146.

The foils 116 wrap along transition surfaces of the base 132 into the corresponding foil openings 160. The foils 116 wrap around the transition surfaces directly to the foil contacts 174, 274. The foils 116 wrap around the outer edges 194, 294 such that the foils 116 engage the interiors 190, 290 and the exteriors 192, 292 of the positive and negative terminals 150, 152, respectively (note 290, 292, 294 illustrated in FIG. 2). Other termination methods are possible in alternative embodiments.

Figure 4:
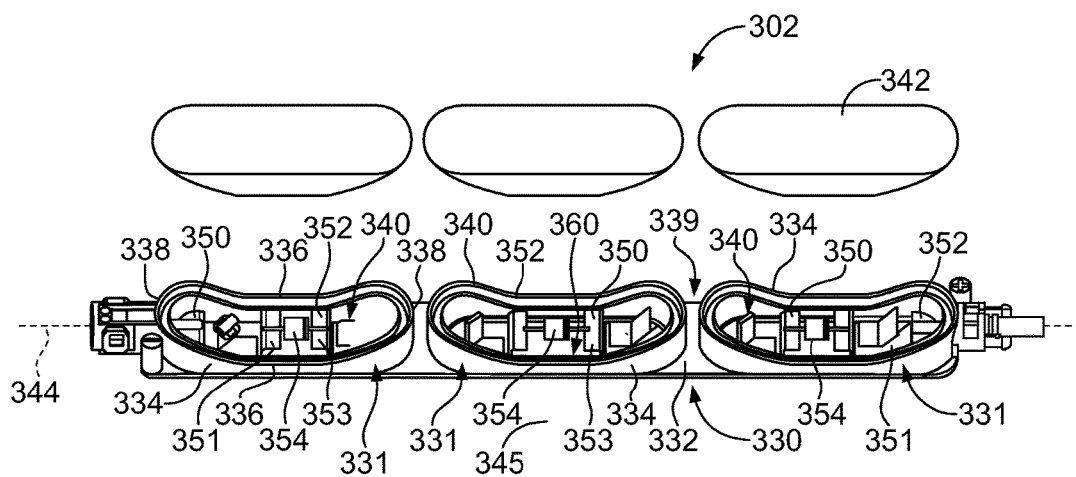
FIG. 4 is a perspective, partially exploded view of a solar junction box in accordance with an exemplary embodiment.

FIG. 4 is a top perspective, partially exploded view of a solar junction box 302 in accordance with an exemplary embodiment. The solar junction box 302 is similar to the solar junction box 102 (shown in FIG. 1); however the solar junction box 302 is a centralized or multi-connection solar junction box where multiple foil circuits are terminated to the same solar junction box 302, as opposed to the decentralized or individual solar junction box 102 (where multiple individual junction boxes may be mounted to the same solar panel, such as to connect multiple (e.g., three) foil circuits). The solar junction box 302 may be mounted to the solar panel 106 (shown in FIG. 1).

The solar junction box 302 includes a multi-compartment housing 330 having a plurality of compartments 331 mounted to a common base 332. The base 332 is configured to be mounted to the solar panel 106. The housing 330 includes a plurality of walls 334 extending from the base 332 and defining the compartments 331. Any number of walls 334 may be provided to provide appropriate shaped compartments 331 for the particular application. In the illustrated embodiment, the walls 334 include side walls 336 and end walls 338 extending between the side walls 336. Optionally, the side walls 336 may be drooped inward, which may allow easier access to the compartments 331, such as for termination of the electrical components, and/or which may make the solar junction box 302 more flexible, such as to accommodate thermal flexing or mechanical/stress flexing of the solar panel (e.g., from wind or snow loads).

The compartments 331 may have any shape, including being long and narrow, with the side walls 336 longer than the end walls 338. Other shapes are possible in alternative embodiments. Optionally, the outermost compartments 331 may be configured for mating with external electrical components, such as connector assemblies (e.g., the connector assemblies 104). The compartments 331 are separate from each other with gaps 339 therebetween. The gaps 339 allow the solar junction box 302 to be more flexible, such as to accommodate thermal flexing or mechanical/stress flexing of the solar panel (e.g., from wind or snow loads).

The side walls 336 and end walls 338 define a cavity 340 of each compartment 331. The solar junction box 302 also includes lids or covers 342 for each of the compartments. The solar junction box 302 holds electrical components configured to be electrically connected to one or more of the foils 116 (shown in FIG. 1) in the cavity 340. The cover 342 covers the cavity 340 and electrical components.

The housing 330 is long and narrow and generally extends along a mutually perpendicular primary axis 344 and secondary axis 346. The primary axis 344 may extend in a longitudinal direction and may define a longitudinal axis 344. The secondary axis 346 may extend in a lateral direction and may define a lateral axis 346. In an exemplary embodiment, the side walls 336 are generally parallel to the primary axis 344 and the end walls 338 are generally parallel to the secondary axis 346. Optionally, the end walls 338 and/or the side walls 336 may be curved.

In an exemplary embodiment, the solar junction box 302 includes a positive terminal 350 and a negative terminal 352 in each cavity 340. Optionally, at least some of the terminals 350, 352 may be common to multiple compartments 331. For example, the terminals 350, 352 in the inner compartment 331 also extend into the adjacent compartment to define one of the terminals 350, 352 therein. In an exemplary embodiment, the solar junction box 302 includes a bypass diode 354 in each compartment 331 between the corresponding terminals 350, 352. The bypass diode 354 may be electrically connected to each of the terminals 350, 352. Optionally, the bypass diode 354 may be approximately centered between the end walls 338. The solar junction box 302 may include other electrical components in alternative embodiments.

The positive terminal 350 is terminated to a corresponding foil 116 and the negative terminal 352 is terminated to a corresponding foil 116. In an exemplary embodiment, the terminals 350, 352 are configured to receive the foils 116 from different directions (e.g., when the foils 116 run up and down the panel 106 or when the foils 116 run side-to-side across the panel 106). The terminals 350 and/or 352 may be terminated to other components, such as electrical connectors or cables.

The terminals 350, 352 are positioned near corresponding foil openings 360 in the base 332. The foil openings 360 receive corresponding foils 116 and allow the foils 116 to pass into the cavity 340. The foil openings 360 are configured to receive the corresponding foils 116, which may enter the housing 330 from different various directions (e.g., longitudinally or laterally). For example, the foil opening 360 is sized and shaped to receive the foil 116 when (if) the foil is extending along the primary axis 344 and when (if) the foil 116 extends along the secondary axis 346. The foil opening 360 is able to accept the foil 116 from either direction. Optionally, each foil opening 360 may span approximately the entire compartment 331 (e.g., the cavity 340 is open at the bottom to define the foil opening 360).

Figure 5:
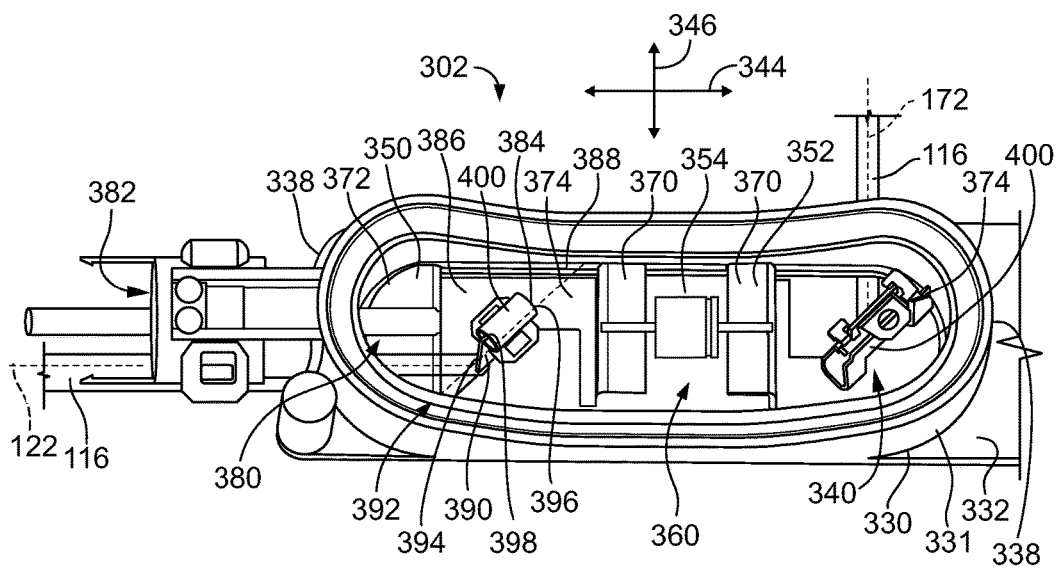
FIG. 5 is a perspective view of a portion of the solar junction box shown in FIG. 4.

FIG. 5 is a perspective view of a portion of the solar junction box 302 showing one of the compartments 331 (e.g., an end compartment); however the other compartments may include similar features and components and will not be described in detail.

The positive terminal 350 is mounted within the cavity 340 and is configured to be electrically connected to the positive foil 116, the bypass diode 354 and may be electrically connected to another component, such as one of the connector assemblies 104 (shown in FIG. 1). In an exemplary embodiment, the positive terminal 350 includes a protection device contact 370 configured to be terminated to the bypass diode 354. The positive terminal 350 includes a plug contact 372 configured to be terminated to the connector assembly 104 or other components (some terminals may not include plug contacts as such terminals may not be terminated to a plug or other connector assembly 104). The positive terminal 350 includes a foil contact 374 configured to be terminated to the foil 116. The terminal 350 may include intermediate segments extending between the protection device contact 370, plug contact 372 and/or foil contact 374. Optionally, the protection device contact 370 may be oriented generally horizontally, the plug contact 372 may be oriented generally horizontally, and the foil contact 374 may be oriented generally vertically; however other configurations are possible in alternative embodiments. Optionally, the terminal 350 may include one or more mounting pads for mounting the terminal 350 to the housing 330.

The plug contact 372 includes a plug interface 380 configured to be electrically connected to the connector assembly 104 or other component. The plug interface 380 may be accessible through an opening 382 in the end wall 338, which may include a boss for terminating the connector assembly 104 thereto. A portion of the connector assembly 104 may extend though the opening 382 and terminate to the plug contact 372, such as by soldering, welding, crimping, IDC connection, spring connection, and the like. Alternatively, a portion of the plug interface 380 may extend through the opening 382 for electrical connection to the connector assembly 104. In other alternative embodiments, an interconnect may make connection between the plug contact 372 and the connector assembly 104.

The foil contact 374 is oriented within the cavity 340 such that the foil contact 374 is configured to be terminated to the foil 116 when the foil 116 extends into the foil opening 360 along the primary axis 344 and the foil contact 374 is oriented within the cavity 340 such that the foil contact 374 is configured to be terminated to the foil 116 when the foil 116 extends into the foil opening 360 along the secondary axis 346. As such, the foil contact 374 is oriented to accept the foil 116 from multiple directions. The foil contact 374 allows the foil 116 to come from either direction into the housing 330 to be terminated thereto.

In the illustrated embodiment, the foil contact 374 includes a tab 384 extending from a base 386. The base 386 may extend along the base 332. Optionally, the tab 384 is oriented perpendicular to the base 386. The tab 384 is aligned with the foil opening 360 to accept the foil 116 when the foil 116 extends into the foil opening 360 along the primary axis 344 and when the foil 116 extends into the foil opening 360 along the secondary axis 346.

In an exemplary embodiment, the tab 384 is oriented transverse to the primary axis 344 and transverse to the secondary axis 346. For example, the tab 384 may extend along a contact axis 388 oriented approximately 45° to the primary axis 344 and approximately 45° to the secondary axis 346. Other configurations are possible in alternative embodiments. The tab 384 is oriented within the cavity 340 such that the foil contact 374 is configured to be terminated to the foil 116 when the foil 116 extends into the foil opening 360 along the primary axis 344 and such that the foil contact 374 is configured to be terminated to the foil 116 when the foil 116 extends into the foil opening 360 along the secondary axis 346.

During assembly, the foil 116 is configured to wrap along and over the tab 384, such as transverse across the foil contact 374. The tab 384 of the foil contact 374 has an interior 390 facing the opening 360 and an exterior 392 opposite the interior 390. The foil contact 374 has first and second side edges 394, 396 and an outer edge 398 opposite the base 386 between the first and second side edges 394, 396. The foil 116 extends transverse across the tab 384 generally from the first side edge 394 at the base 386 toward the second side edge 396 at the outer edge 398 when the foil 116 extends into the foil opening 360 along the primary axis 344. The foil 116 extends transverse across the tab 384 generally from the second side edge 396 at the base 386 toward the first side edge 394 at the outer edge 398 when the foil 116 extends into the foil opening 360 along the secondary axis 346. For example, the foil axis 122 is oriented transverse to the first and second side edges 394, 396 and is transverse to the outer edge 398 when extending along the primary axis 344 or the secondary axis 346.

In an exemplary embodiment, a clip 400 is used to secure the foil 116 to the foil contact 374. For example, the clip 400 may be an omega clip (e.g., omega shaped) that pinches against both sides of the foil contact 374. The foil 116 may wrap transversely around the foil contact 374, and the clip 400 may sandwich the foil 116 between the foil contact 374 and the clip 400 along both sides of the foil contact 374. Other types of clips may be provided in alternative embodiments. In other various embodiments the foil 116 may be terminated to the foil contact 374 by other processes other than using a clip. For example, the foil 116 may be pinched by a lance or other portion integral with the terminal 350 or the foil 116 may be welded or soldered to the foil contact 374.

Figure 6:
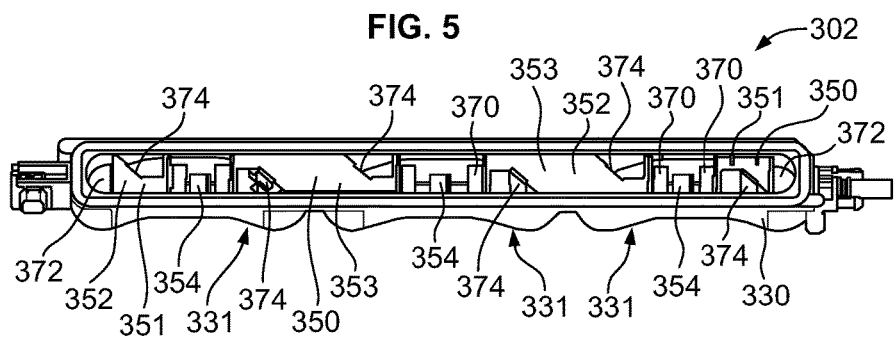
FIG. 6 is a perspective view of the solar junction box shown in FIG. 4.

The negative terminal 352 is mounted within the cavity 340 and is configured to be electrically connected to the negative foil 116, the bypass diode 354 and may be electrically connected to another component, such as one of the connector assemblies 104 (shown in FIG. 3), or may extend from the cavity 340 of the end compartment 331 to the cavity of the center compartment 331 (shown in FIG. 4). In such embodiments where the terminal 352 extends into the adjacent compartment 331, the terminal 352 is different than the terminal 350. For example, as shown in FIG. 6 and in FIG. 4, the terminal 352 may have two foil contacts 374 and two protection device contacts 370. Alternatively, the negative terminal 352 may be identical to the positive terminal 350 and may be rotated 180° within the cavity 340.

FIG. 6 is a bottom perspective view of the solar junction box 302 showing the terminals 350, 352 positioned within the housing 330. FIG. 6 illustrates two end terminals 351 and two center terminals 353. The positive terminal 350 described above with reference to FIG. 5 is an exemplary embodiment of one of the end terminals 351 (e.g., includes the protection device contact 370, plug contact 372 and foil contact 374). The center terminals 353 are double terminals configured to be received in two adjacent compartments 331. The center terminals 353 have two protection device contacts 370 and are terminated between the bypass diodes 354 in the adjacent compartments 331. The center terminals 353 have two foil contacts 374 received in different compartments 331. The center terminals 353 do not include any plug contacts 372 as the connector assemblies 104 are electrically connected to the end terminals 351 at the end compartments 331. Optionally, only one of the foil contacts 374 of the center terminals 353 are terminated to one of the foils 116, the other being unterminated.

In an exemplary embodiment, and with additional reference to FIG. 4, one of the end terminals 351 is a negative terminal 352 and the other end terminal 351 is a positive terminal 350, while one of the center terminals 353 is a negative terminal 352 and the other center terminal 353 is a positive terminal 350. In the illustrated embodiment, from right to left, the solar junction box 302 includes first a positive end terminal 350, 351; second a negative center terminal 352, 353; third a positive center terminal 350, 353; and fourth a negative end terminal 352, 351.

Figure 7:
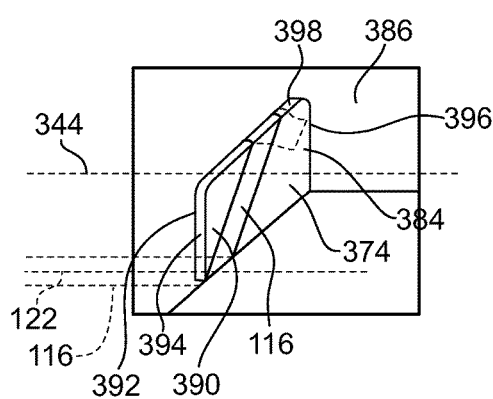
FIG. 7 is a perspective view of a portion of the solar junction box with a foil in a first orientation.
Figure 8:
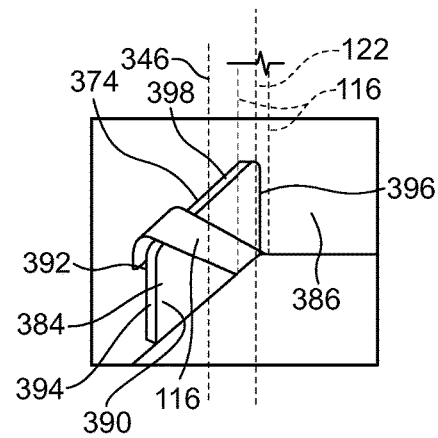
FIG. 8 is a perspective view of a portion of the solar junction box with a foil in a second orientation.

FIG. 7 is a perspective view of the foil 116 terminated to the foil contact 374 in a first orientation. FIG. 8 is a perspective view of the foil 116 terminated to the foil contact 374 in a second orientation. FIG. 7 shows the foil 116 extending along the primary axis 344 (e.g., the foil axis 122 parallel to the primary axis 344) and FIG. 8 shows the foil 116 extending along the secondary axis 346 (e.g., the foil axis 122 parallel to the secondary axis 346).

As shown in FIG. 7, when extending along the primary axis 344 (e.g., longitudinally), the foil 116 wraps around the tab 384 transversely because the tab 384 is oriented at approximately 45° to the primary axis 344. The foil 116 extends transverse across the interior 390 of the tab 384 generally from the first side edge 394 at the base 386 toward the second side edge 396 at the outer edge 398 and then wraps around the exterior 392. As shown in FIG. 8, when extending along the secondary axis 346 (e.g., laterally), the foil 116 wraps around the tab 384 transversely because the tab 384 is oriented at approximately 45° to the secondary axis 344. The foil 116 extends transverse across the interior 390 of the tab 384 generally from the second side edge 396 at the base 386 toward the first side edge 394 at the outer edge 398 and then wraps around the exterior 392.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. A solar junction box for a solar panel having at least one photovoltaic cell and a foil electrically connected to the at least one cell, the solar junction box comprising:
    a housing having a base and walls defining a cavity, the cavity extending along a primary axis and a secondary axis generally perpendicular to the primary axis, the base having at least one foil opening configured to receive the foil along the primary axis and configured to receive the foil along the secondary axis;
    a protection device received in the cavity;
    a terminal received in the cavity in a mounted position, the terminal having a protection device contact terminated to the protection device, the terminal having a foil contact configured to be terminated to the foil, the foil contact having a first mating interface and a second mating interface different from the first mating interface, the foil contact being oriented within the cavity in the mounted position such that the first mating interface of the foil contact is configured to be terminated to the foil when the foil extends into the at least one foil opening along the primary axis and such that the second mating interface of the same foil contact is configured to be terminated to the foil when the foil extends into the at least one opening along the secondary axis, wherein the first mating interface interfaces with the foil along the primary axis differently than the second mating interfacing with the foil along the secondary axis;
    wherein the foil contact is oriented within the cavity along a contact axis oriented approximately 45° to the primary axis and approximately 45° to the secondary axis such that the foil contact is configured to be terminated to the foil when the foil extends into the foil opening along the primary axis and such that the foil contact is configured to be terminated to the foil when the foil extends into the foil opening along the secondary axis; and
    wherein the foil contact has an interior facing the opening and an exterior opposite the interior, the foil contact having first and second side edges and an outer edge opposite a base of the foil contact between the first and second side edges, the foil extending transverse across the foil contact generally from the first side edge at the base toward the second side edge at the outer edge when the foil extends into the foil opening along the primary axis and the foil extending transverse across the foil contact generally from the second side edge at the base toward the first side edge at the outer edge when the foil extends into the foil opening along the secondary axis.

2. The solar junction box of claim 1, wherein the foil is configured to wrap transverse across an interior of the foil contact.

3. The solar junction box of claim 1, wherein the foil extends along a foil axis, the foil axis being oriented transverse to the first and second side edges and being transverse to the outer edge.

4. The solar junction box of claim 1, further comprising a clip coupled to the foil contact, the clip holding the foil in electrical contact with the foil contact.

5. The solar junction box of claim 1, wherein the opening is configured to receive the foil when the foil extends along the primary axis and the opening is configured to receive the foil when the foil extends along the secondary axis.

6. A solar junction box for a solar panel having at least one photovoltaic cell and a foil electrically connected to the at least one cell, the solar junction box comprising:
    a housing having a base and walls defining a cavity, the cavity extending along a primary axis and a secondary axis generally perpendicular to the primary axis, the base having at least one foil opening;
    a protection device received in the cavity;
    a terminal received in the cavity, the terminal having a protection device contact terminated to the protection device, the terminal having a foil contact configured to be terminated to the foil, the foil contact being oriented within the cavity along a contact axis oriented approximately 45° to the primary axis and approximately 45° to the secondary axis such that the foil contact is configured to be terminated to the foil when the foil extends into the foil opening along the primary axis and such that the foil contact is configured to be terminated to the foil when the foil extends into the foil opening along the secondary axis, wherein the foil contact interfaces with the foil differently when extending along the primary axis than when extending along the secondary axis;
    wherein the foil contact has an interior facing the opening and an exterior opposite the interior, the foil contact having first and second side edges and an outer edge opposite a base of the foil contact between the first and second side edges, the foil extending transverse across the foil contact generally from the first side edge at the base toward the second side edge at the outer edge when the foil extends into the foil opening along the primary axis and the foil extending transverse across the foil contact generally from the second side edge at the base toward the first side edge at the outer edge when the foil extends into the foil opening along the secondary axis.

7. The solar junction box of claim 6, wherein the foil is configured to wrap transverse across an interior of the foil contact.

8. The solar junction box of claim 6, wherein the foil is configured to wrap around the outer edge.

9. The solar junction box of claim 6, wherein the foil extends along a foil axis, the foil axis being oriented transverse to the first and second side edges and being transverse to the outer edge.

* * * * *